July 29, 1969   H. S. SMITH ET AL   3,458,609
METHOD AND APPARATUS FOR PREPARING FOAMED PLASTIC SLABS
Filed Jan. 6, 1966   2 Sheets-Sheet 1

INVENTORS.
Hubert Stacey Smith
Donald R. Wright
Douglas S. Chisholm
BY
Robert B. Ingraham
AGENT July 29, 1969  H. S. SMITH ET AL  3,458,609
METHOD AND APPARATUS FOR PREPARING FOAMED PLASTIC SLABS
Filed Jan. 6, 1966  2 Sheets-Sheet 2

INVENTORS.
Hubert Stacey Smith
Donald R. Wright
Douglas S. Chisholm
BY
AGENT

United States Patent Office 3,458,609
Patented July 29, 1969

3,458,609
METHOD AND APPARATUS FOR PREPARING FOAMED PLASTIC SLABS
Hubert Stacey Smith, Essexville, and Donald R. Wright and Douglas S. Chisholm, Midland, Mich., assignors to The Dow Chemical Company, Midland, Mich., a corporation of Delaware
Filed Jan. 6, 1966, Ser. No. 519,074
Int. Cl. B29g 7/02
U.S. Cl. 264—46           10 Claims

ABSTRACT OF THE DISCLOSURE

A slab is generated by depositing a foamable hardenable resinous material such as a polyurethane in a spiral configuration to provide a monolithic slab.

---

This invention relates to a method and apparatus for the preparation of large foam plastic slabs and more particularly relates to a method and apparatus for producing large foam plastic slabs from an expandable, foamable, hardenable material.

Frequently it is desirable to have available foam plastic slabs of relatively large dimension and oftentimes such slabs are required to have dimensions greater than those that can be conveniently prepared by extrusion or conventional foaming techniques. Oftentimes it is desirable that such slabs conform closely to dimensional tolerances and that such slabs be prepared at a location where they are to be employed. For example, frequently it is desirable to incorporate a foam slab in the floor of a building or like structure to provide both insulation and to provide a water barrier. Such a water barrier generally is not obtained when a plurality of smaller slabs are assembled.

It is an object of this invention to provide an improved method for the preparation of large foam slabs.

A further object is to provide an improved apparatus for the preparation of the large foam slabs.

A further object of this invention is to provide a method and apparatus which will prepare a foam slab of a desired configuration.

Another object of the invention is to provide a method and apparatus for the direct preparation of a foam slab on a suitable underlayment.

These benefits and other advantages, in accordance with the method of the present invention, are obtained by continuously providing a foamable, hardenable resinous material confining the foamable, hardenable resinous material within a desired configuration, continuously moving the configuration as the foamable, hardenable materials foams and hardens to form a unitary foam plastic body, in a generally spiral-like pattern, joining adjacent turns of spirally deposited foam to form a monolithic cellular, foam slab.

The method of the invention is beneficially practiced in employing the apparatus of the present invention, which comprises in cooperative combination, a foam depositing head, the head comprising in cooperative combination at least a side forming belt and a terminal forming belt, the belts adapted to be driven at equal rates and defining a channel, a supply means adapted to provide a foamable, hardenable material, a foam discharge means adapted to discharge foamable hardenable material into the channel defined by the forming belts and means to guide the forming head in a predetermined spiral-like pattern.

The present invention is readily practiced employing any of the expandable, hardenable foam-forming compositions including foam-forming polyurethane compositions, phenol-formaldehyde foam-forming compositions and the like. Beneficially the exothermic self-reacting foam-forming compositions, which are employed, will depend upon the end use and physical properties desired in the production, and such compositions are well known to those skilled in the foam preparation art and are readily selected to meet the requirements of a particular application.

Further features and advantages of the present invention will become more apparent from the drawings wherein:

FIGURE 1 schematically represents an apparatus for practicing the method of the invention.

Figure 1:
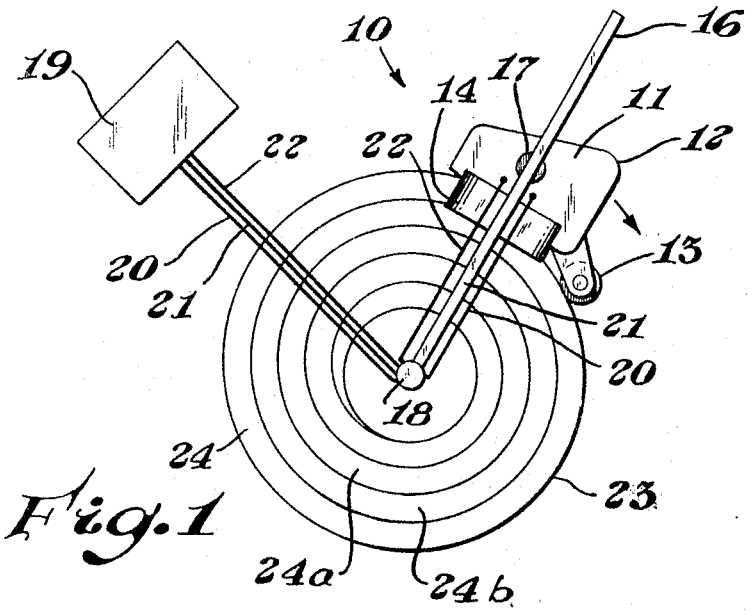

In FIGURE 1 there is schematically illustrated a foam slab forming apparatus generally designated by the reference numeral 10. The foam forming apparatus 10 comprises in cooperative combination a foam depositing head 11. The foam depositing heads 11 comprises a housing 12 containing operating mechanism and a foam depositing means, not shown. Rotatably affixed to the housing 12 is a spacing roller 13. A side forming belt 14 is operatively mounted to the housing 15, the belt 14 is an endless belt and moves in a direction such as the head 11, propels at a suitable rate in the direction of the arrow. A boom or support means 16 is slideably affixed to the housing 12 at a support point 17. The boom 16 is rotatably affixed to a central pivot 18 about which the boom 16 is free to rotate. A power source and foamable material source 19 is operatively connected to the head 11 by means of the lines 20, 21 and 22 which contain appropriate swivel joints, not shown, at the pivot 18. A foam slab 23 is shown generally centered about the pivot 18. The foam slab 23 comprises a continuous strip of foam 24 formed in a spiral configuration wherein adjacent turns such as 24a and 24b are securely bonded to each other.

Figure 2:
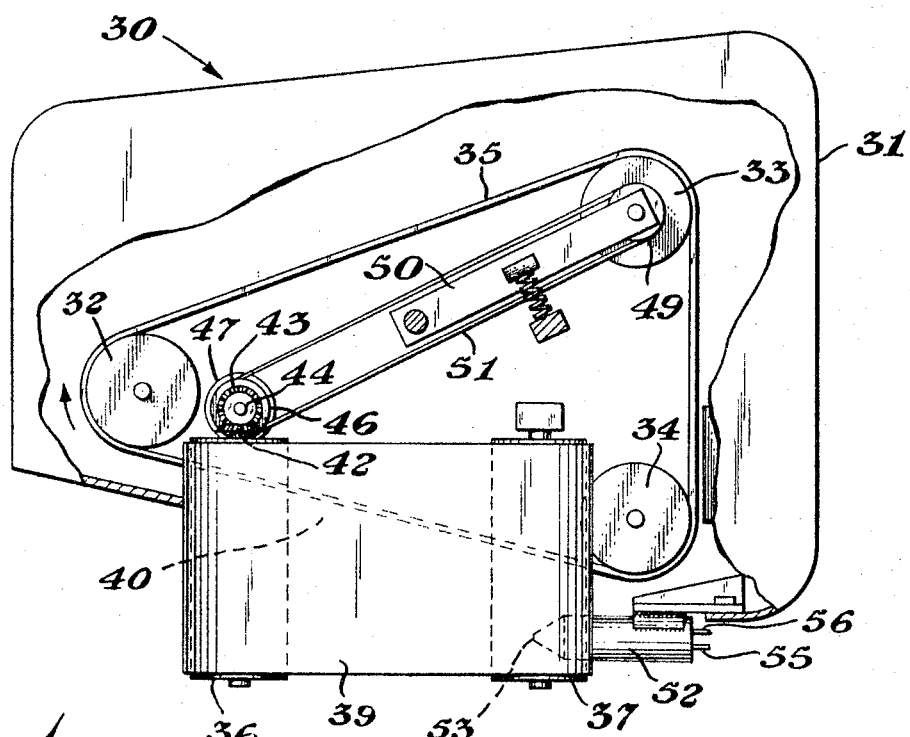
FIGURE 2 is a schematic cut away view of a foam-forming head such as is depicted in FIGURE 1.

In FIGURE 2 there is illustrated a schematic sectional view of a foam-forming head, in accordance with the present invention, generally designated by the reference numeral 30. The head 30 comprises a housing or frame 31 having rotatably mounted therein a first end belt roll 32, a second end belt roll 33 and a third end belt roll 34. An endless belt, or end belt 35 passes about the periphery rolls of 32, 33 and 34. Also rotatably mounted within the housing are side forming belt support rolls 36 and 37. The axis of the rolls 36 and 37 are disposed parallel to each other and in a plane normal to a plane containing the axis of two of the rolls 32, 33 and 34. An endless side forming belt 39 passes over the periphery of rolls 36 and 37. A channel 40 is defined by the adjacent surfaces of the belts 39 and 35. The roll 36 has affixed thereto a bevel gear 42 which is in cooperative combination with a second bevel gear 43. The bevel gear 43 is affixed to the rotatable shaft 44 which carries a sprocket gear or pulley 46. The shaft is rigidly affixed to a motor or drive means 47. A pulley or sprocket gear 49 is affixed to the pulley 33 and is in operative combination with the pulley 46 by means of the belt 50. A belt tension mount 51 resiliently forces the roll 33 away from the roll 34. The drive is so constructed and arranged that the surface speeds of the belt 35 and 39 are substantially equal and the direction of travel is the same in the region where the belts lie adjacent to each other and define the channel 40. A foamable fluid dispensing means 52 is disposed adjacent the rolls 34 and 37 and projects into the channel 40. The dispensing means of 52 has a nozzle or discharge portion 53. The dispenser 52 is in operative combination with supply lines 55 and 56 adapted to supply foamable, hardenable material to the head 52.

Figure 3:
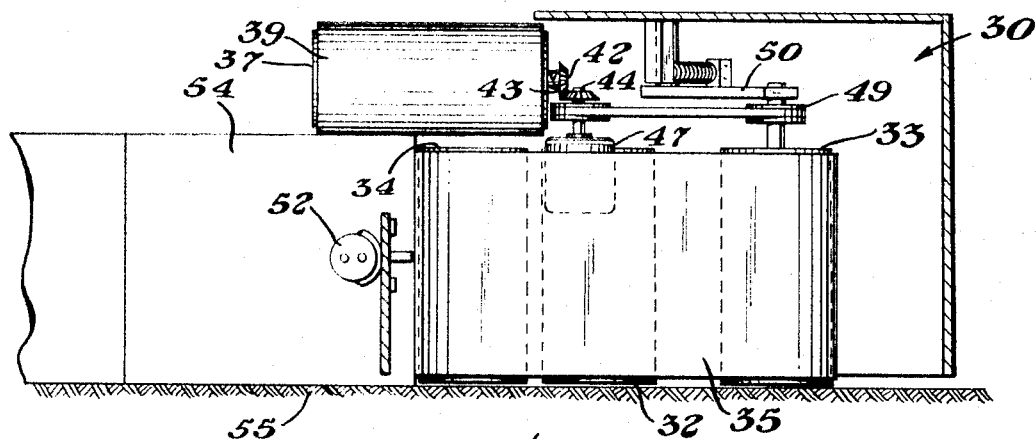
FIGURE 3 is an end view of the foam-forming head of FIGURE 2.

FIGURE 3 is a schematic representation of an end view of the head of FIGURE 2 illustrating the relative positions of the belts 35 and 39, also there is shown a foam dispensing means 52. The channel 40 formed by the belts 35 and 39 is shown in operating relationship of the head 30 to a previously formed foam portion 54 supported on a support means 55 such as earth, concrete slab or the like.

In operation of the method and apparatus of the invention, as depicted in FIGURES 1, 2 and 3 a head such as the head 11 or 30 is positioned on a boom or support means such as the boom 16. A foamable, hardenable material is supplied to the foam dispensing means such as the dispenser 52, which injects a a foamable, hardenable substance into the channel 40 where it expands to form a hardened cellular mass. The rate of travel of the belts, such as the belts 35 and 39, is adjusted to a rate such that the foamable, hardenable material cures sufficiently to be at least suporting before emerging from the channel defined by the belts. Beneficially employing the dual belt heads such as shown in FIGURES 2 and 3, the channel 40 is formed from and bonded by the two belts, a previously foamed layer or turn such as 54 and a support upon which the slab rests such as the support 55. The head such as the head 30 or 16 may be supported entirely by the support means or boom 16 or alternately may obtain support from the ground or support 55. By progressively depositing a foam strip, which is bonded to the adjacent strip, previously deposited slabs of very large sizes are readily prepared.

Figure 4:
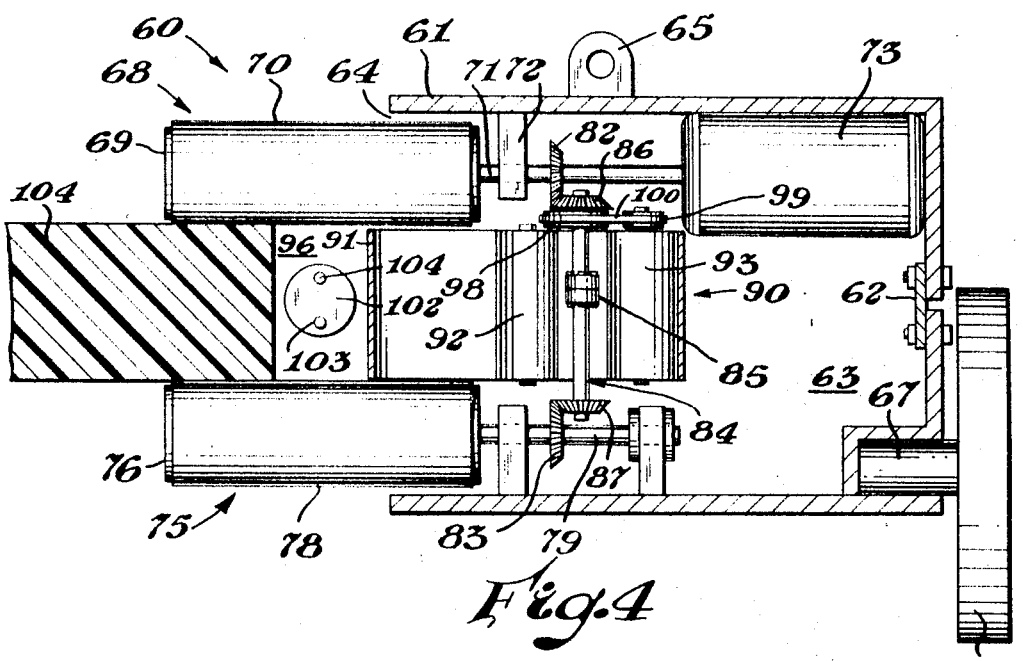
FIGURE 4 is a sectional view of an alternate foam-forming head suitable for the practice of the present invention.

In FIGURE 4 there is illustrated an alternate embodiment of a foam forming head, in accordance with the present invention, generally designated by the reference numeral 60, the foam depositing head 60 comprises a hollow two part housing 61 having housing portion 61a and 61b held together by connector 62, the housing 61, defines an internal cavity 63 and an open side 64. The housing has rigidly affixed to its upper side a pivot or support member 65, adapted to engage a support arm, not shown. A support wheel or roll 66 is pivotly affixed to the housing 61 by means of the stub shaft 67. A first side belt assembly 68 is supported by the housing 61, the first side belt assembly comprises a first driver roll 69, an idler roll (not shown) and lying directly behind the roll 69. An upper side forming belt 70 passes over the driver roll and the idler roll (not shown). A shaft 71 is secured to the roll 69 and journaled within a bearing 72 affixed to the housing 61. A drive means, or gear head motor 73 is affixed to the shaft 71 and rotates the drive roll 69 in a desired direction. A second side forming belt assembly 75 is oppositely disposed to the side belt assembly 68. The assembly 75 comprises a driving roll 76 and a second idler roll (not shown). A belt 78 passes over the drive roll 76 and the idler roll (not shown). The belt 78 is endless and is disposed parallel to the belt 70 of the first side belt assembly 68. A two piece shaft 84 extends between the shafts 71 and 79, generally adjacent the bevel gears 82 and 83. The portions of the shaft 84 are joined by a coupling 85. The shaft 84 is rotatably mounted by means not shown. The shaft 84 carries the oppositely disposed bevel gears 86 and 87, which are in operative engagement with the bevel gears 82 and 83, respectively. An end forming belt assembly 90 is supported within the housing 61 in such a manner that an endless belt 91 passes between the side forming belt assembly 68 and 75. The belt 91 is supported by a first idler roll 92, a a second idler roll (not shown) and positioned in a manner generally similar to that of FIGURE 2 and a driver roll 93. The belts 70, 78 and 97 define a channel 96. A sprocket gear 98 is rigidly affixed to the shaft 84 and is in operative engagement with a sprocket gear 99 affixed to the roll 93 by means of a chain 100. A foam dispensing head 102 is disposed within the channel 96 and is supplied with components by means of the lines 103 and 104. A portion of a previously formed foam body 104 is shown disposed between the portions of the forming belt assembly 68 and 75, remote from the end forming belt 91.

The operation of the foam depositing head of FIGURE 4 is substantially identical to the operation of the device of FIGURES 2 and 3 with the exception that the foam-forming belt assembly 75 is added, which provides support on three sides for the foam slab being prepared. Thus, utilizing the embodiment of FIGURE 4, unsupported foam slabs of relatively large dimension are readily prepared, such slabs may then be used as formed or cut into a desired configuration.

Figure 5:
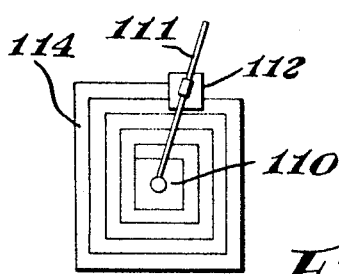
FIGURE 5 is a schematic representation of an alternate manner of forming a slab of cellular material.

In FIGURE 5 there is illustrated an alternate method of preparing a slab, in accordance with the present invention. A rectangular starting block 110 is centrally positioned with respect to a supporting means 111 for a foam depositing head 112. The starter block 110 has a rectangular configuration and the foam depositing head 112 is supported in a freely slidable manner on the support means 111. On rotation of the support means 111 the head 112 describes a rectangular spiral path about the starting block 110 and deposits successive turns of a rectangular spiral 114 of a hardened foam material thereby producing rectangular slabs. Employing apparatus substantially as illustrated, large slabs of foam are readily prepared.

By way of further illustration, employing a foam depositing head generally in accordance with FIGURES 2 and 3 wherein the channel defined by the forming belts is 30 inches in length and two and one half inches in width and about three inches in depth. A forty foot diameter slab is constructed utilizing a spiral generation technique employing a foamable self-extinguishing polyurethane composition which comprises a first component (a) which is a mixture of

ISOCYANATE COMPONENT

| Material: | Parts by wt. |
|---|---|
| Polymethylenepolyphenyl isocyanate | 146.4 |
| Trisbetachloroethyl phosphate | 32.6 |
| Silicone glycol copolymer | 2.2 |

The second component (b) comprised a mixture of an amine polyglycol which was the condensation product of 1 ml. ethylene diamine, 1 ml. ethylene oxide and 3 mls. of propylene oxide, 71 parts by weight; trichlorofluoromethane, 47.8 parts by weight; nitromethane, 2.2 parts by weight; and N,N-dimethyl ethanol amine, 1.3 parts by weight.

The components $a$ and $b$ were fed to the foam depositing head in a ratio of 1.5 parts $a$ to 1 part of $b$ at a rate of about 0.63 pound per minute to deposit a strip of foam having a density of about 2 pounds per cubic foot and at a rate of about 0.3 of a cubic foot per minute. The foam depositing nozzle was a portion of a one-quarter inch pipe (nominal size). The components $a$ and $b$ were mixed at a temperature of about 75° C. and cured to a tack-free condition in from 15 to 20 seconds. The belts defining the channel were coated with polytetrafluoroethylene and heated to a temperature of 140° F. The linear speed of deposition was about six feet per minute. The resultant foamed polyurethane slab shows a good bonding between adjacent turns of the deposited foam and a smooth upper surface. Sampling of the slab indicates that each turn of the foam strip is a generally rectangular section wherein the density of the foam increases sharply toward the outer surfaces thereby providing an element having a high modulus and excellent strength per unit weight of material deposited. In all cases low pressure (less than 10 p.s.i.) is exerted on the belts.

In a manner similar to the foregoing illustration and employing an apparatus substantially as illustrated in FIGURE 4, a 20 foot diameter slab was prepared employing the foamable components of the previous illustration.

Similar beneficial results are achieved when the following foamable hardenable compositions are employed.

Composition A

A mixture of 44.5 parts by weight of phenol, 55.5 parts of an aqueous formaldehyde solution of 37 weight percent concentration and 1.5 parts of sodium hydroxide was reacted at 60° centigrade for 6 hours. At this stage of the reaction, the liquid condensation product was water-soluble. The mixture was then acidified by addition of 33 cc. of aqueous sulphuric acid of 30 percent concentration, per pound of the mixture to which the acid was added. The acidified mixture was agitated, while warmed to about 40° centigrade for from 2 to 3 hours. The aqueous and organic layers of the mixture were separated and the organic layer was washed thoroughly with water. The water-insoluble liquid phenol-formaldehyde product thus obtained retained from 20 to 35 percent of water dissolved therein.

The resultant resin was subjected to vacuum at a temperature of about 28° C. until about 13 percent by weight of the total mixture had been removed. The weight loss is water. Twenty parts of the resin are admixed with 1.8 parts of trichlorotrifluoroethane and heated to 45° C. Concentrated aqueous hydrochloric acid is continuously admixed with the resin-trichlorotrifluoroethane mixture and a tack-free expanded phenolic foam is obtained 15 seconds after mixing.

Composition B 20 parts by weight of the phenol-formaldehyde resin of Composition A is admixed with 1 part by weight phenol, 1.8 parts by weight trichlorotrifluoroethane. On admixture of 22.8 parts of the resin-phenol-halogenated ethane mixture with 2.5 parts of concentrated hydrochloric acid a tack-free foam is obtained 12 seconds after mixing.

Composition C

Component (1) is a liquid epoxy resin of the epichlorohydrin-bisphenol type prepared by the reaction of excess epichlorohydrin with Bisphenol A in the presence of sodium hydroxide to provide a prepolymer having an average epoxide equivalent weight of about 240, and subsequently removing the excess epichlorohydrin. The resultant prepolymer is a viscous liquid. 80 parts by weight of the viscous liquid is admixed with 19.5 parts by weight of trichloromonofluoromethane and 0.5 part by weight of a silicone glycol copolymer sold under the designation of DC-113 and utilized to control the cell size of the resultant foam. Component (2) comprises 72 parts by weight of tris-2,3-dibromo propyl phosphate, 25.3 parts by weight of triethylene glycol and 2.7 parts by weight of boron trifluoride. One hundred parts of Component (1) are admixed with 7.1 parts of Component (2) and a rigid plastic foam which is tack-free is obtained 15 seconds after mixing.

Other foamable, hardenable compositions well known to those skilled in the art are useful in preparing structures in accordance with the present invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method for providing a slab of a foamed plastic material on a generally flat support, the method comprising
    continuously providing a foamable, hardenable resinous material in the form of a continuous strip,
    confining the foamable, hardenable resinous material within a desired configuration defined by a foam forming means and
    the support rotating the foam forming means through a plurality of revolutions in a spiral-like manner to form contiguous adjacent turns, to form a unitary plastic body wherein the adjacent turns adhere to each other to form a monolithic cellular slab.

2. The method of claim 1 wherein a starter block of a foamed plastic material is generally centrally disposed and said monolithic cellular slab formed thereabout.

3. The method of claim 1 wherein the foamable hardenable material is a polyurethane composition.

4. The method of claim 1 wherein the configuration is defined by a moving belt-like surface.

5. The method of claim 4 including the step of applying heat to cure the hardenable composition.

6. An apparatus for the preparation of foamed plastic slabs comprising in cooperative combination a foam dispensing head, the head comprising in cooperative combination at least a side forming belt and a terminal forming belt, the belts adapted to be driven at equal rates, the belts defining a channel therebetween, a supply means adapted to supply a foamable, hardenable material, a foam dispensing means adapted to discharge foamable hardenable material into the channel defined by the forming belts and means to guide the forming head in a predetermined spiral-like pattern.

7. The apparatus of claim 6 including a second side forming belt oppositely disposed the first side forming belt and disposed adjacent the terminal forming belt.

8. The apparatus of claim 6 including a supporting roll pivotally fixed to the forming head and adapted to be supported by the ground.

9. The apparatus of claim 6 including means to heat the foamable hardenable material.

10. The apparatus of claim 6 wherein the forming head is slideably mounted upon a pivot arm and the head is adapted to be rotated in a spiral configuration.

References Cited

UNITED STATES PATENTS

| | | | |
|---|---|---|---|
| 2,412,576 | 12/1946 | Giles | 156—184 XR |
| 3,193,438 | 7/1965 | Schafer | 156—184 XR |
| 2,339,892 | 1/1944 | Urschel. | |
| 2,671,939 | 3/1954 | Everhart et al. | |
| 2,877,530 | 3/1959 | Winn. | |
| 3,170,972 | 2/1965 | Knipp et al. | 264—54 XR |
| 3,206,899 | 9/1965 | Wright | 264—45 XR |
| 3,265,786 | 8/1966 | Voelker | 264—54 |
| 3,336,631 | 8/1967 | Smith | 264—47 XR |
| 3,336,632 | 8/1967 | Smith | 264—47 XR |

PHILIP E. ANDERSON, Primary Examiner

U.S. Cl. X.R.

18—5; 52—309, 741; 156—79, 242; 161—159; 264—54, 308